United States Patent
Yadav et al.

(10) Patent No.: US 11,261,753 B2
(45) Date of Patent: Mar. 1, 2022

(54) METHOD AND DEVICE FOR CONNECTING FAN ROTOR TO LOW PRESSURE TURBINE ROTOR

(71) Applicant: General Electric Company, Schenectady, NY (US)

(72) Inventors: Abhijeet Jayshingrao Yadav, Bangalore (IN); Nicholas Joseph Kray, West Chester, OH (US); Nitesh Jain, Bangalore (IN); Saurabh Sanjay Rasal, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1053 days.

(21) Appl. No.: 15/832,814

(22) Filed: Dec. 6, 2017

(65) Prior Publication Data
US 2019/0170012 A1 Jun. 6, 2019

(51) Int. Cl.
*F01D 21/08* (2006.01)
*F02K 3/06* (2006.01)
(Continued)

(52) U.S. Cl.
CPC ............. *F01D 21/08* (2013.01); *F01D 25/16* (2013.01); *F01D 25/162* (2013.01); *F02C 3/107* (2013.01);
(Continued)

(58) Field of Classification Search
CPC .......... F01D 21/08; F01D 25/162; F02K 3/06; F02C 7/36; F16D 3/185; F16D 1/10;
(Continued)

(56) References Cited

U.S. PATENT DOCUMENTS

| 3,680,895 A | 8/1972 | Herbert et al. | |
| 3,727,998 A * | 4/1973 | Haworth | F01D 25/16 384/99 |

(Continued)

FOREIGN PATENT DOCUMENTS

| EP | 2535527 | 12/2012 |
| WO | 2014152101 | 9/2014 |

OTHER PUBLICATIONS

Youtube video at URL::https://www.youtube.com/watch?v=BQuxTFugMoc, currently dated as Sep. 1, 2015 at the URL. The attachment Includes what are believed to be the most material still Images from this video sequence.
(Continued)

*Primary Examiner* — Richard A Edgar
*Assistant Examiner* — Aye S Htay
(74) *Attorney, Agent, or Firm* — Venable LLP; Elizabeth C. G. Gitlin; Michele V. Frank

(57) ABSTRACT

A rotor assembly includes a fan rotor shaft coupled to a fan rotor, a low pressure turbine rotor shaft coupled to a low pressure turbine rotor, and a joint device configured to connect the fan rotor shaft to the low pressure turbine rotor shaft, to allow torsion, shear and bending to be transferred between the fan rotor shaft and the low pressure turbine rotor shaft under normal operation, and allow torsion and shear but prevent bending to be transferred between the fan rotor shaft and the low pressure turbine rotor shaft under a fan blade-out event.

19 Claims, 9 Drawing Sheets

(51) Int. Cl.
  *F02C 7/36* (2006.01)
  *F01D 25/16* (2006.01)
  *F16D 3/18* (2006.01)
  *F16D 1/10* (2006.01)
  *F02C 3/107* (2006.01)
  *F02C 7/06* (2006.01)

(52) U.S. Cl.
  CPC ............ *F02C 7/06* (2013.01); *F02C 7/36* (2013.01); *F02K 3/06* (2013.01); *F16D 1/10* (2013.01); *F16D 3/185* (2013.01); *F05D 2220/32* (2013.01); *F05D 2230/60* (2013.01); *F05D 2240/60* (2013.01); *F05D 2260/40* (2013.01); *F05D 2260/403* (2013.01); *F16D 2001/103* (2013.01)

(58) Field of Classification Search
  CPC ........... F16D 2001/103; F05D 2220/32; F05D 2230/60; F05D 2240/60; F05D 2260/40
  See application file for complete search history.

(56) References Cited

U.S. PATENT DOCUMENTS

| | | | |
|---|---|---|---|
| 4,154,021 A | | 5/1979 | Griffith |
| D280,628 S | | 9/1985 | Besson |
| 5,282,358 A | | 2/1994 | Schilling |
| 6,331,078 B1 | * | 12/2001 | Van Duyn ............. F01D 25/166 |
| | | | 384/498 |
| 6,491,497 B1 | * | 12/2002 | Allmon ................... F01D 25/16 |
| | | | 416/174 |
| 6,783,319 B2 | * | 8/2004 | Doerflein .............. F01D 21/045 |
| | | | 384/495 |
| 7,008,528 B2 | | 3/2006 | Mitchell et al. |
| 8,167,531 B2 | | 5/2012 | Mollmann et al. |
| 8,191,254 B2 | | 6/2012 | Cardarella, Jr. |
| D706,324 S | | 6/2014 | Watts |
| 8,821,029 B2 | * | 9/2014 | Antunes ................ F01D 25/166 |
| | | | 384/624 |
| 8,967,978 B2 | | 3/2015 | Denis et al. |
| 10,196,934 B2 | * | 2/2019 | Khan ..................... F01D 21/045 |
| 2005/0254945 A1 | * | 11/2005 | VanDuyn ................ F16C 27/04 |
| | | | 415/229 |
| 2010/0119606 A1 | | 5/2010 | Whittle et al. |
| 2012/0260623 A1 | | 10/2012 | McCune |
| 2016/0363171 A1 | | 12/2016 | McKay et al. |

OTHER PUBLICATIONS

Youtube video at URL:: https://www.youtube.com/watch?v=1zJiVnVdxdM, currently dated as Sep. 16, 2016 the attachment Includes what are believed to be the most material still Images from this video sequence.

https://www.youtube.com/watch?v=Gb03Xm4yRL0, currently dated at this URL as Jun. 2, 2016 the attachment Includes what are believed to be the most material still images from this video sequence.

Webpage from www.pollinator.nl, retrieved prior to Jul. 6, 2016.

* cited by examiner

METHOD AND DEVICE FOR CONNECTING FAN ROTOR TO LOW PRESSURE TURBINE ROTOR

FIELD OF THE INVENTION

The present disclosure generally relates to gas turbine engine rotor assemblies, and more specifically to devices and methods for connecting fan rotors to low pressure turbine rotors in gas turbine engine rotor assemblies.

BACKGROUND OF THE INVENTION

Gas turbine engines typically include a rotor assembly, a compressor, and a turbine. The rotor assembly includes a fan that includes an array of fan blades extending radially outward from a rotor shaft. The rotor shaft transfers power and rotary motion from the turbine to the compressor and the fan and is supported longitudinally with a plurality of bearing assemblies. Additionally, the rotor assembly has an axis of rotation that passes through a rotor assembly center of gravity. Known bearing assemblies include rolling elements and a paired race, wherein the rolling elements are supported within the paired race. To maintain rotor critical speed margin, the rotor assembly is supported on three bearing assemblies, one of which is a thrust bearing assembly and a second pair of which are roller bearing assemblies. The thrust bearing assembly supports the rotor shaft and minimizes axial and radial movement of the rotor shaft assembly. The remaining roller bearing assemblies support radial movement of the rotor shaft.

During operation of the engine, a fragment of a fan blade may become separated from the remainder of the blade. Accordingly, a substantial rotary unbalance load may be created within the damaged fan and carried substantially by the fan shaft bearings, the fan bearing supports, and the fan support frames.

To minimize the effects of potentially damaging abnormal imbalance loads, known engines include support components for the fan rotor support system that are sized to provide additional strength for the fan support system. However, increasing the strength of the support components undesirably increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center for gravity. This fuse section, in combination with a rotor clearance allowance, is referred to as a load reduction device, or LRD. The LRD reduces the rotating dynamic loads to the fan support system.

After the primary fuse fails, the pitching fan rotor often induces a large moment to a next closest bearing. The next closest bearing is known as the number two bearing position. The moment induced to the number two bearing induces high bending and stress loads to the fan rotor locally.

It is desirable to provide a gas turbine engine rotor assembly to address at least one of the above-mentioned situations.

SUMMARY OF THE INVENTION

A rotor assembly includes a fan rotor shaft coupled to a fan rotor, a low pressure turbine rotor shaft coupled to a low pressure turbine rotor, and a joint device configured to connect the fan rotor shaft to the low pressure turbine rotor shaft, to allow torsion, shear and bending to be transferred between the fan rotor shaft and the low pressure turbine rotor shaft under normal operation, and allow torsion and shear but prevent bending to be transferred between the fan rotor shaft and the low pressure turbine rotor shaft under a fan blade-out event.

A method for fabricating a rotor assembly for a gas turbine engine include: coupling a fan rotor shaft to a fan rotor; coupling a low pressure turbine rotor shaft to a low pressure turbine rotor; and connecting the fan rotor shaft to the low pressure turbine rotor shaft through a joint device. The joint device is configured to allow torsion, shear and bending to be transferred between the fan rotor shaft and the low pressure turbine rotor shaft under normal operation, and allow torsion and shear but prevent bending to be transferred between the fan rotor shaft and the low pressure turbine rotor shaft under a blade-out event.

A method for reducing unbalanced bearing loading of a gas turbine engine under a fan blade out (FBO) event is provided, wherein the engine includes a fan rotor shaft coupled to a fan rotor and a low pressure turbine rotor shaft coupled to a low pressure turbine rotor. The method includes: operating the gas turbine engine in a normal mode, with the fan rotor shaft and the low pressure turbine rotor shaft connected in torsion, shear and bending; and disconnecting the fan rotor shaft to the low pressure turbine rotor shaft in bending while maintaining the connection between the fan rotor shaft and the low pressure turbine rotor shaft in torsion and shear, when a blade-out event occurs.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE INVENTION

One or more embodiments of the present disclosure will be described below. Unless defined otherwise, technical and scientific terms used herein have the same meaning as is commonly understood by one of skill in the art to which this invention belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any, some, or all of the listed items. The use of "including," "comprising" or "having" and variations thereof herein are meant to encompass the items listed thereafter and equivalents thereof as well as additional items. The term "coupled" or "connected" or the like includes but is not limited to being connected physically or mechanically, and may be connected directly or indirectly.

Embodiments of the present disclosure relate to a rotor assembly of a gas turbine engine, which uses a special joint device to connect a fan rotor shaft (FWD shaft) that is coupled to a fan rotor, to a mid shaft that is coupled to a low pressure turbine (LPT) rotor. The special joint device is configured to allow torsion, shear and bending to be transferred between the fan rotor shaft and the mid shaft under normal operation, and allow torsion and shear but prevent bending to be transferred between the fan rotor shaft and the mid shaft under a fan blade-out event. As such, the fan rotor is basically disconnected from the LPT rotor in bending under the blade-out event, to allow angular misalignment between the fan rotor and the LPT rotor under the blade-out event. Therefore, the application of the special joint device helps reducing bearing loads under the blade-out event and hence helps reducing the overall weight of structural components. As used herein, the term "fan blade-out event" or "blade-out event" refers to fan blade breaking off within the engine.

Figure 1:
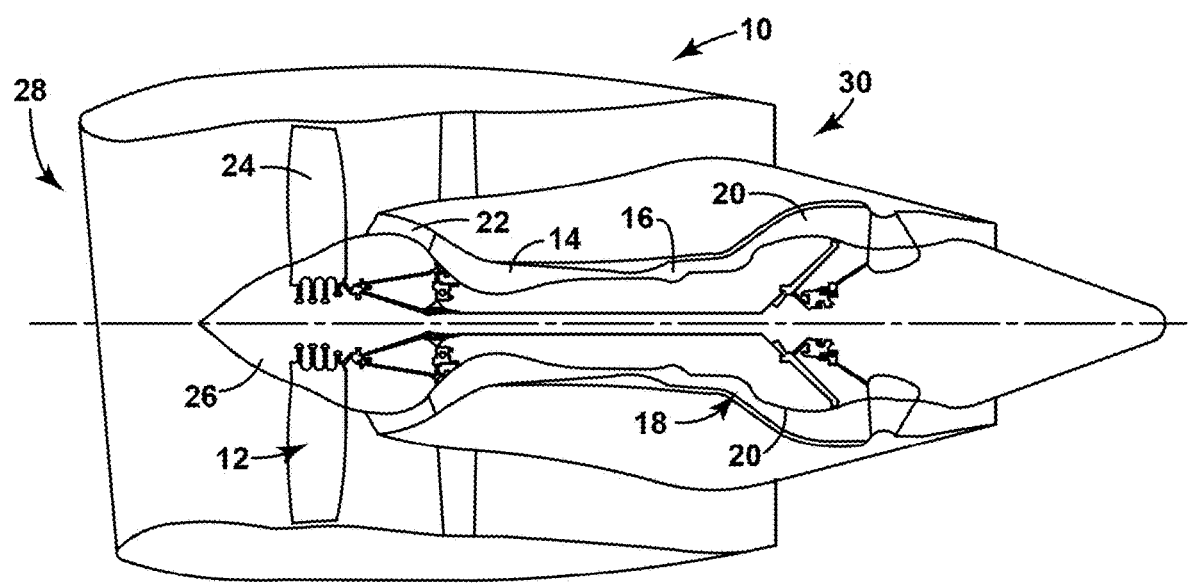
FIG. 1 is a schematic view of a gas turbine engine.

FIG. 1 is a schematic illustration of a gas turbine engine 10 including a fan assembly 12, a high pressure compressor 14, and a combustor 16. Engine 10 also includes a high pressure turbine (HPT) 18, a low pressure turbine (LPT) 20, and a booster 22. Fan assembly 12 includes an array of fan blades 24 extending radially outward from a rotor disc 26. Engine 10 has an intake side 28 and an exhaust side 30. In one embodiment, the gas turbine engine is a multi-spool turbofan engine, which includes a low pressure spool connecting rotor disc 26 to a LPT rotor (not shown in FIG. 1) and a high pressure spool connecting the compressor 14 to a HPT rotor (not shown in FIG. 1). In one embodiment, the gas turbine engine is a GE90 available from General Electric Company, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
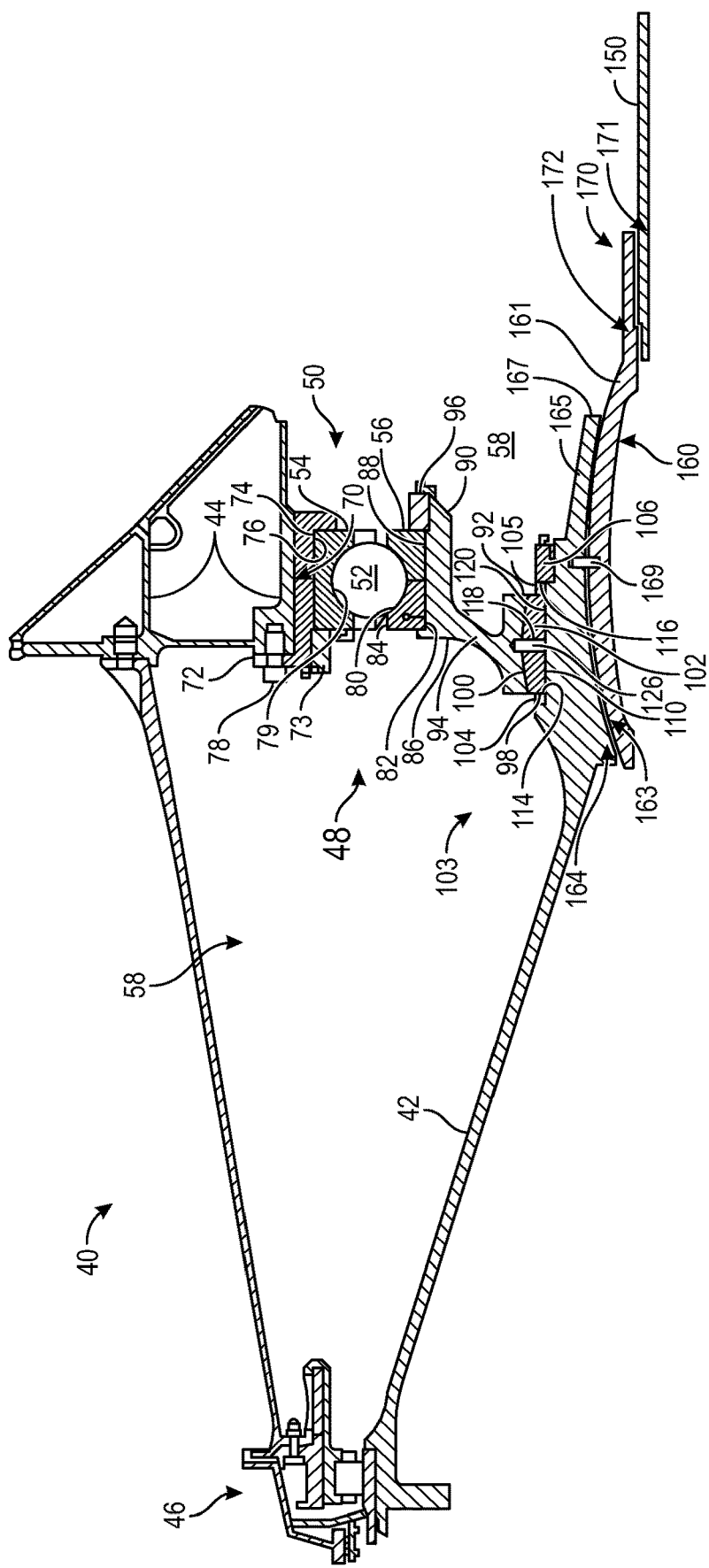
FIG. 2 is a partial cross-sectional view of an exemplary rotor assembly that may be used with the gas turbine engine shown in FIG. 1, in which a spherical spline joint is used to connect a fan rotor to a low pressure turbine (LPT) rotor.

FIG. 2 is a schematic cross-sectional view of a rotor assembly 40 that may be used with a gas turbine engine, such as engine 10 shown in FIG. 1. Rotor assembly 40 includes rotor disc 26 (shown in FIG. 1) and a rotor shaft 42 which supports an array of fan blades 24 (shown in FIG. 1) that extend radially outward from rotor disc 26. Rotor shaft 42 is rotatably secured to a structural support frame 44 with longitudinally spaced bearing assemblies 46 and 48 that support rotor shaft 42 on support frame 44. In one embodiment, bearing assembly 48 is located in a number two bearing position, aft of number one bearing 46, and is a fan thrust bearing.

In an exemplary embodiment, each bearing assembly 48 includes a paired race 50 and a rolling element 52. Paired race 50 includes an outer race 54 and an inner race 56 radially inward from outer race 54. Rolling element 52 is disposed between inner race 56 and outer race 54. Bearing assembly 48 is enclosed within a sealed annular compartment 58 radially bounded by rotor shaft 42 and support frame 44. Rolling element 52 may be a plurality of elements including, but not limited to, a ball bearing or a roller bearing.

Support frame 44 includes a recess 70 defined within a bearing support 72 and sized to receive outer race 54. Outer race 54 is secured within bearing support 72 with a spanner nut 73 such that an outer surface 74 of outer race 54 is adjacent an inner surface 76 of bearing support 72. A fastener 78 secures bearing support 72 and outer race 54 within recess 70. In one embodiment, bearing support 72 is radially flexible. A face 79 of outer race 54 is contoured and sized to receive rolling element 52 in rollable contact.

Inner race 56 includes a face 80 and an inner surface 82. Inner race face 80 is contoured and sized to receive rolling element 52 in rollable contact. Inner race 56 is secured within a recess 84 within a cone shaft 86 such that inner race inner surface 82 is adjacent an outer surface 88 of recess 84. In one embodiment, inner race 56 is split race mating and rolling element 52 is a ball bearing. In another embodiment, outer race 54 is split race mating and rolling element 52 is a ball bearing.

Cone shaft 86 extends radially outward from fan rotor shaft 42 and includes an outer portion 90, an inner portion 92, and a body 94 extending therebetween. Recess 84 extends within cone shaft outer portion 90 and is sized to receive inner race 56. A bearing spanner nut 96 secures inner race 56 within cone shaft recess 84. Body 94 provides axial and radial support to bearing assembly 48. Cone shaft inner portion 92 includes an inner surface 98. Inner surface 98 is contoured to fit in slidable contact against a face 100 of a mounting race 102. More specifically, in one embodiment, cone shaft inner portion 92 and mounting race 102 are known as a mounting joint 103.

Mounting race 102 reduces static loads to rotor assembly 40 and dynamic loads to support frame 44. In one embodiment, mounting race 102 is secured to fan rotor shaft 42 with a pair of spacers 104 and 105, and a spanner nut 106. Accordingly, mounting race 102 rotates simultaneously with rotor shaft 42. Fan rotor shaft 42 includes a recess 110 sized to receive mounting race 102 and spacers 104 and 105 such that a gap (not shown) exists between an inner face 114 of spacer 104 and an inner face 116 of spacer 105. Mounting race face 100 is a spherical surface. In one embodiment, mounting race 102 is radially thin and is ovalized elastically to assemble to cone shaft inner portion 92.

A plurality of mechanical fuses 118 extend through mounting race 102 into cone shaft inner portion 92 to couple mounting race 102 to cone shaft inner portion 92. More specifically, each fuse 118 extends from an inner surface 120 of mounting race 102 through spherical face 100 and at least partially into cone shaft inner portion 92. In the exemplary embodiment, each mechanical fuse 118 extends radially outward along a centerline axis of mounting race 102.

In the exemplary embodiment, each fuse body 126 has a cross-sectional profile that is substantially constant through body 126. In an alternative embodiment, each fuse body 126 includes an area (not shown) along a shear plane that has a reduced cross-sectional profile. The shear plane is defined as the plane of fuse 118 at mounting race face 100. The reduced cross section at the shear plane provides radial clearance to avoid fuse edge loading and/or stress concentrations during normal spherical deflections. Shear failure, as described in more detail below, will still be the primary failure mode.

During operation of engine 10, an unbalance of engine 10 may cause high radial forces to be applied to fan assembly 12 (shown in FIG. 1) and a forward most engine bearing. The high radial forces may cause a primary fuse portion 118 to fail at an engine number one bearing position. The primary fuse failure allows fan assembly 12 to rotate about a new axis of rotation, passing through a center of gravity of rotor shaft 42 and inducing bending loads on rotor shaft 42 that induce a moment load on bearing assembly 48 at the number two engine bearing position.

Mechanical fuse 118 is fabricated from a material that fails at a pre-determined moment load applied to rotor shaft 42. Furthermore, the material used to fabricate mechanical fuse 118, and the design of mounting joint 103 enables more accurate predictions of the failure point of mechanical fuse 118. After mechanical fuse 118 fails in shear, mounting race spherical face 100 allows shaft 42 to pitch such that a shaft center of rotation (not shown) approaches that of the new rotor center of gravity. The spacers 104 and 105 allow for rotor pitching such that rotor 42 does not contact shaft inner portion 92.

The pitch rotation occurs once because an unbalance radial load has no relative rotation to shaft 42. Rotor shaft 42 remains in a singular bent position because the unbalance radial load is in a singular location. As a result, mounting race spherical face 100 does not oscillate and bearing assembly faces 79 and 80 remain flush against bearing assembly rolling element 52 while rotor shaft 42 rotates. Accordingly, static bending loads transmitted to rotor assembly 40 are reduced because no moment load is induced through bearing 52 after mechanical fuses 118 fail. Furthermore, because no moment load is carried through surfaces 98 and 100, bearing assembly 48 retains radial and axial load capability.

Because a moment restraint is released, rotor assembly 40 is permitted to approach the rotor center of gravity and dynamic loads induced to support frame 44 are reduced. Furthermore, because spherical mounting face 100 and rolling element 52 keep rotor shaft 42 positioned axially with respect to support frame 44, turbine clashing between rotor assembly 40 and a stator assembly (not shown) is substantially eliminated.

The fan rotor shaft 42 is connected to a LPT rotor shaft (a mid shaft coupled to a LPT rotor) 150 via a joint device 160 for transmitting torsion, shear, and bending during normal operation, and transmitting torsion and shear under a blade-out event. Thus, the fan rotor and the LPT rotor are connected in shear, torsion and bending under normal operation, and only connected in shear and torsion under the fan blade-out event.

Figure 3:
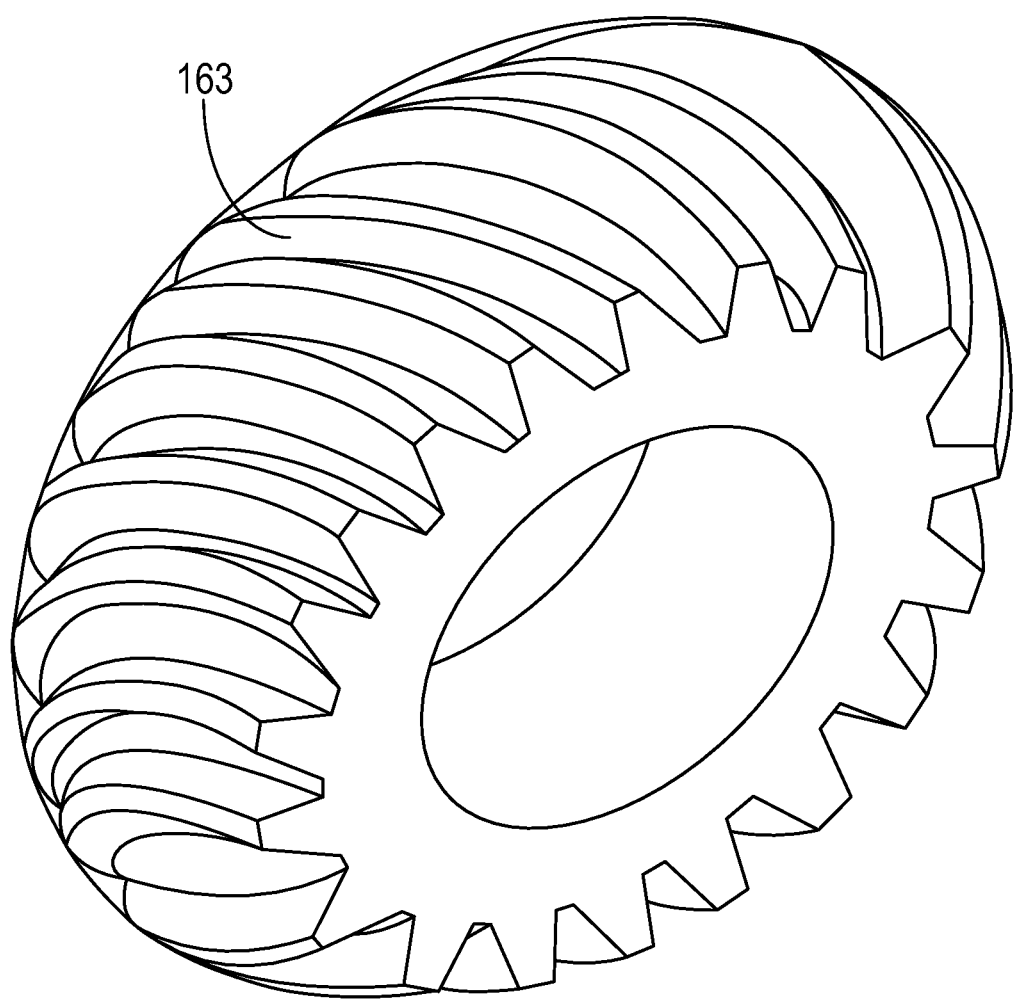
FIG. 3 is a perspective view of an exemplary spherical spline joint that may be used with the rotor assembly in FIG. 2.

In the exemplary embodiment, the joint device 160 includes a spherical spline joint 161. As shown in FIG. 3, the spherical spline joint 161 is a spherical joint with a plurality of circumferentially-spaced spherical splines (curved splines) 163, which can be accommodated in and engage spline grooves 164 defined in the fan rotor shaft 42. As used herein, the term "spherical spline" may refer to a spline curve which lies in a sphere or a sphere-like object. In one embodiment, the spherical splines 163 are substantially parallel to each other and each extends along a curved direction. The spherical splines 163 are slidable in the spline grooves 164 along the extending directions thereof, in order to allow relative bending motion between the fan rotor shaft 42 and the LPT rotor shaft 150 connected by the spherical spline joint 161 under the blade-out event. Allowing relative bending motion between the two shafts under the blade-out event helps reducing the natural frequency of the fan rotor and also helps avoiding low pressure to high pressure spool rub.

In the exemplary embodiment, the joint device 160 is coupled to an aft portion 165 of the fan rotor shaft 42 near an aft end 167 of the fan rotor shaft 42, around the number two bearing position, and the joint device 160 is radially inward from the cone shaft 86, with the aft end 167 of the fan rotor shaft 42 sandwiched between the cone shaft 86 and the joint device 160. More specifically, the cone shaft 86 is coupled to a radially outward side of the aft end 167 via the mounting race 102, and the joint device 160 is coupled to a radially inward side of the aft end 167.

The joint device 160 may further include one or more mechanical fuses 169 extending into both the fan rotor shaft 42 and the spherical spline joint 161. During normal operation of engine 10, the mechanical fuses 169 can prevent relative bending motion between the fan rotor shaft 42 and the LPT rotor shaft 150, and such that combined loadings of torsion, shear, and bending are transferred between the fan rotor shaft 42 and the LPT rotor shaft 150 through the joint device 160. Once fan blade-out occurs, loads applied to the fan assembly significantly increase due to appearing unbalance, which causes the mechanical fuses 169 to fail. The fuse failure allows said relative bending motion between the two shafts. As such, the spherical spline joint 161 does not transfer bending from input shaft to output shaft but still transfers torque and shear.

The spherical spline joint 161 may be replaced with any suitable joints that is capable of transmitting torsion, shear, and bending during normal operation, and transmitting torsion and shear but not bending under a blade-out event. Some non-limiting examples of suitable joints include constant velocity universal joints that allow variation in the angle between the input and output shafts and maintain substantially constant angular velocity (such as Rzeppa joints and Birfield joints) and axial couplings for angular misalignment. All these joints that can achieve load reduction by disconnecting the fan rotor shaft from the low pressure turbine rotor shaft in bending under the blade-out event may be named as load reduction joints.

In some embodiments, the joint device 160 may further include an auxiliary joint for quickly assembling the fan rotor to the LPT rotor and disassembling the fan rotor from the LPT rotor. The auxiliary joint may be a cylindrical spline joint 170, because assembly/disassembly of a fan rotor and a LPT rotor connected via a cylindrical spline joint is easier than assembly/disassembly of a fan rotor and a LPT rotor connected via a spherical spline joint. The cylindrical spline joint 170 may include a plurality of cylindrical splines 171 and cylindrical spline grooves 172 for accommodating and engaging the cylindrical splines 171. The cylindrical spline joint 170 may be configured to allow shear, torsion and bending to be transferred either under normal operation or under the fan blade-out event. In the exemplary embodiment, the cylindrical spline grooves 172 are defined on an inner face of the spherical spline joint 161 and the cylindrical splines 171 are formed on an outer face of the LPT rotor shaft 150. In other embodiments, the auxiliary joint may be any other joints via which the fan rotor can be assembled to or disassembled from the LPT rotor more easily than via a spherical spline joint, for example, joints that enable the fan rotor and the LPT rotor to be assembled and disassembled along an axial direction of the engine 10.

Figure 4:
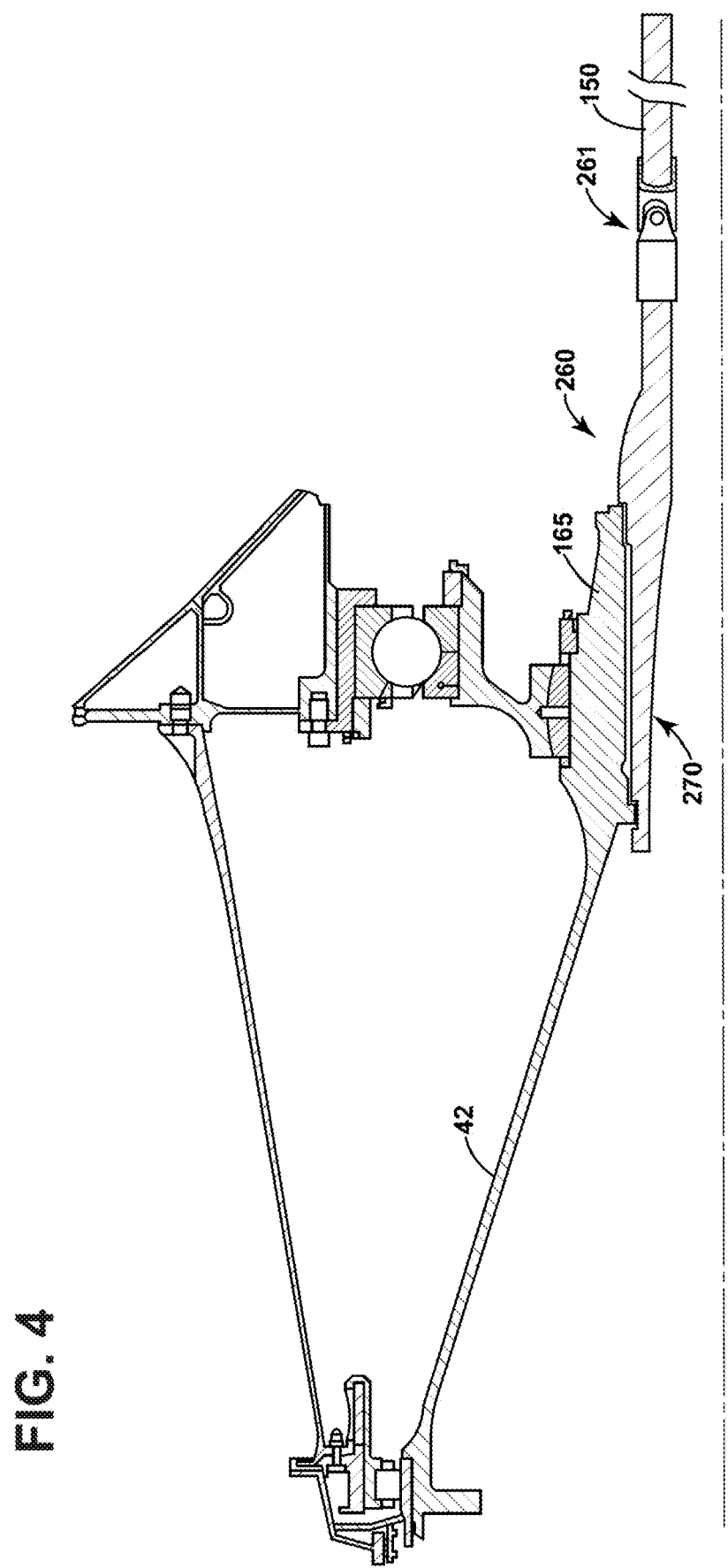
FIG. 4 is a partial cross-sectional view of an exemplary rotor assembly that may be used with the gas turbine engine shown in FIG. 1, in which a constant velocity universal joint is used to connect a fan rotor to a LPT rotor.
Figure 5:
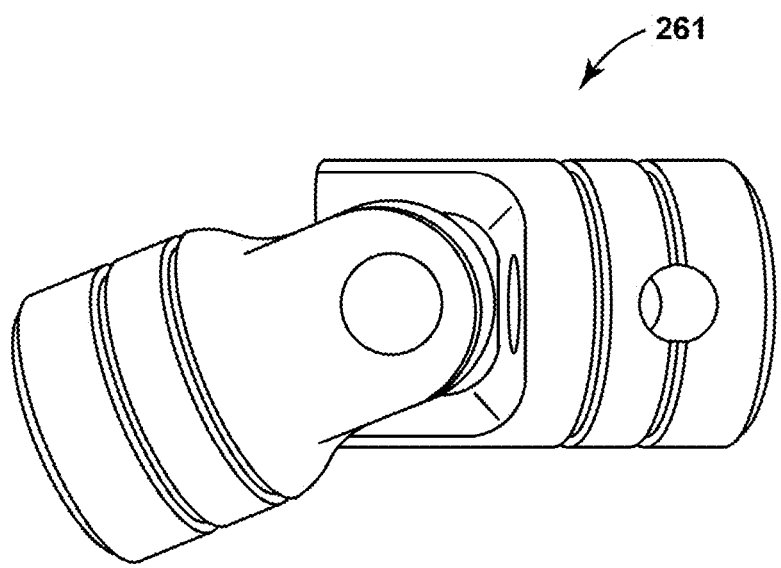
FIG. 5 is a perspective view of an exemplary constant velocity universal joint that may be used with the rotor assembly in FIG. 4.
Figure 6:
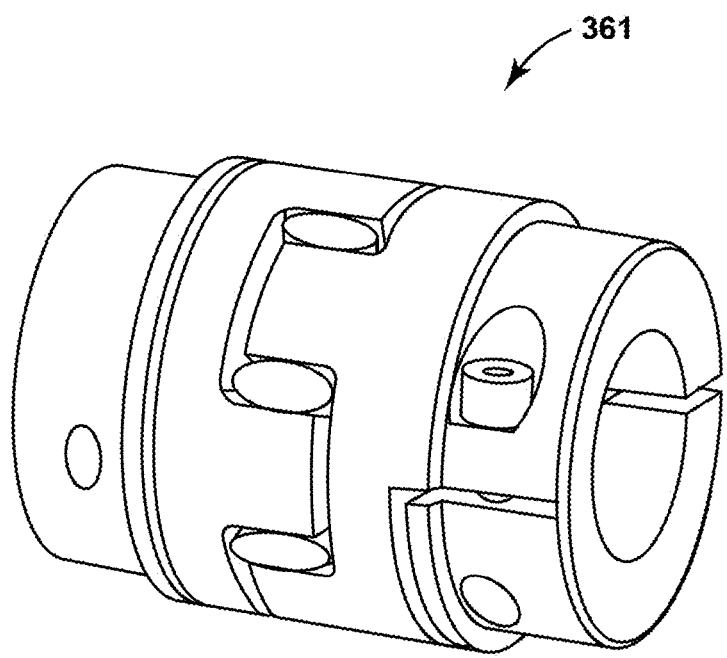
FIG. 6 is a perspective view of an exemplary axial coupling that may be used with the rotor assembly in FIG. 4.

FIG. 4 illustrates an exemplary rotor assembly basically similar to the rotor assembly 40, except that the fan rotor shaft 42 is connected to the LPT rotor shaft 150 via a joint device 260 including a constant velocity universal joint 261 instead of the spherical spline joint 161. As shown in FIG. 4, the joint device 260 further includes a cylindrical spline joint 270 located forward of the constant velocity universal joint 261, as the auxiliary joint. The constant velocity universal joint 261 is coupled to the LPT rotor shaft 150. The cylindrical spline joint 270 includes cylindrical splines formed on one of the constant velocity universal joint 261 and the aft portion 165 of fan rotor shaft 42, and cylindrical spline grooves defined on the other of the constant velocity universal joint 261 and the aft portion 165, for accommodating and engaging the cylindrical splines. FIG. 5 is a perspective view showing a structure of the constant velocity universal joint 261 according to one exemplary embodiment. In some embodiments, the constant velocity universal joint 261 may be replaced with an axial coupling 361 shown in FIG. 6.

Generally under the fan blade-out event, unbalance loads are higher when fan rotor hits its natural frequency (resonance). Since there is no bending connection between the fan rotor shaft 42 and the LPT rotor shaft 150 under the fan blade-out event, the natural frequency of fan rotor can be decreased and hence unbalance loads due to the fan blade-out event also can be reduced.

In order to demonstrate at least some advantages of the rotor assemblies as described above, an exemplary rotor assembly of the present disclosure (proposed example) and a comparative rotor assembly (comparative example) are tested to simulate the normal operation and fan blade-out event. In the proposed example, the fan rotor and the LPT rotor are connected through a spherical spline joint as described above to allow torsion and shear but prevent bending to be transferred therebetween under the fan blade-out event. In the comparative example, the fan rotor and the LPT rotor are connected through a cylindrical spline joint to allow shear, torsion and bending to be transferred under the fan blade-out event.

Figure 7:
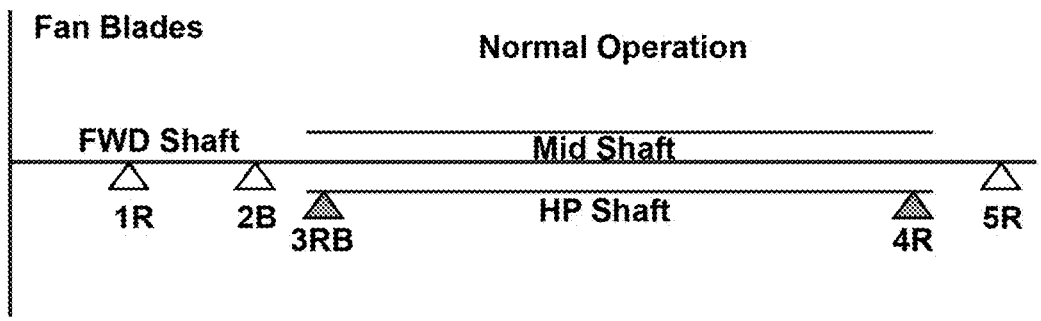
FIG. 7 illustrates a status of a fan rotor shaft (FWD shaft) and a LPT rotor shaft (mid shaft) in a comparative example or a proposed example under normal operation.

FIG. 7 illustrates a status of the fan rotor shaft (FWD shaft) and a LPT rotor shaft (mid shaft) in either proposed example or comparative example under normal operation. "1R", "2B" "3RB", 4R" and "5R" in FIG. 7 represent the locations (stations) of the number one to five bearings in the engine. As illustrated, there is no bending on the FWD shaft and mid shaft under normal operation.

Figure 8:
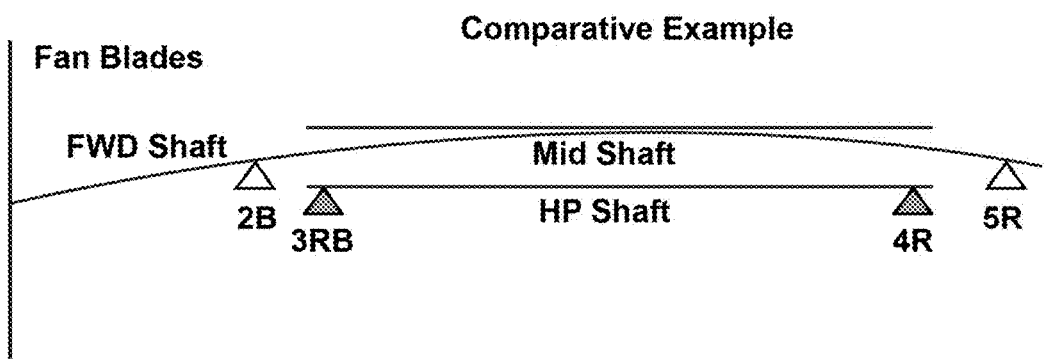
FIG. 8 illustrates a status of the FWD shaft and the mid shaft in the comparative example under the fan blade-out event.
Figure 9:
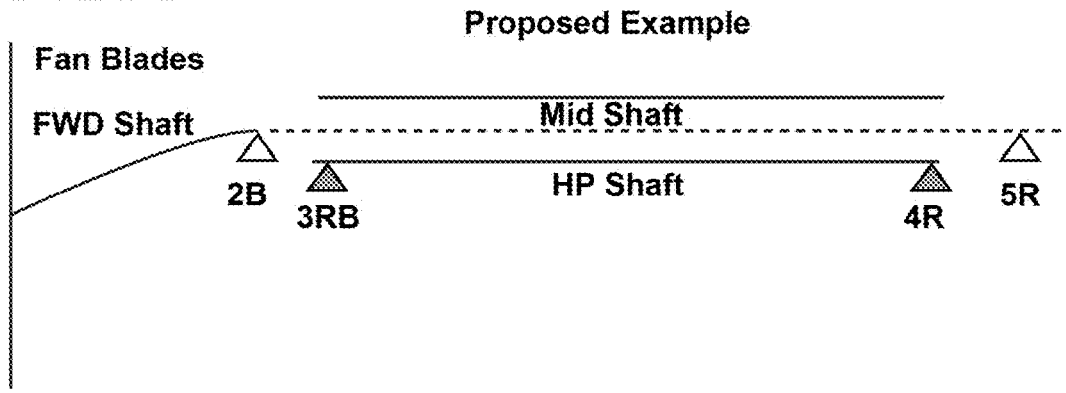
FIG. 9 illustrates a status of the FWD shaft and the mid shaft in the proposed example under the fan blade-out event.

FIG. 8 illustrates a status of the FWD shaft and the mid shaft in the comparative example under the fan blade-out event, and FIG. 9 illustrates a status of the FWD shaft and the mid shaft in the proposed example under the fan blade-out event. As illustrated in FIGS. 8 and 9, the fan rotor in the comparative example has a higher natural frequency because of stiffener fan rotor and because of shaft to shaft rub, and has higher bearing loads at decoupled mode, whereas the fan rotor in the proposed example has a much lower natural frequency because of softer fan rotor and because there is no shaft to shaft rub, and has much lower bearing loads because there is no decoupled mode.

Figure 10:
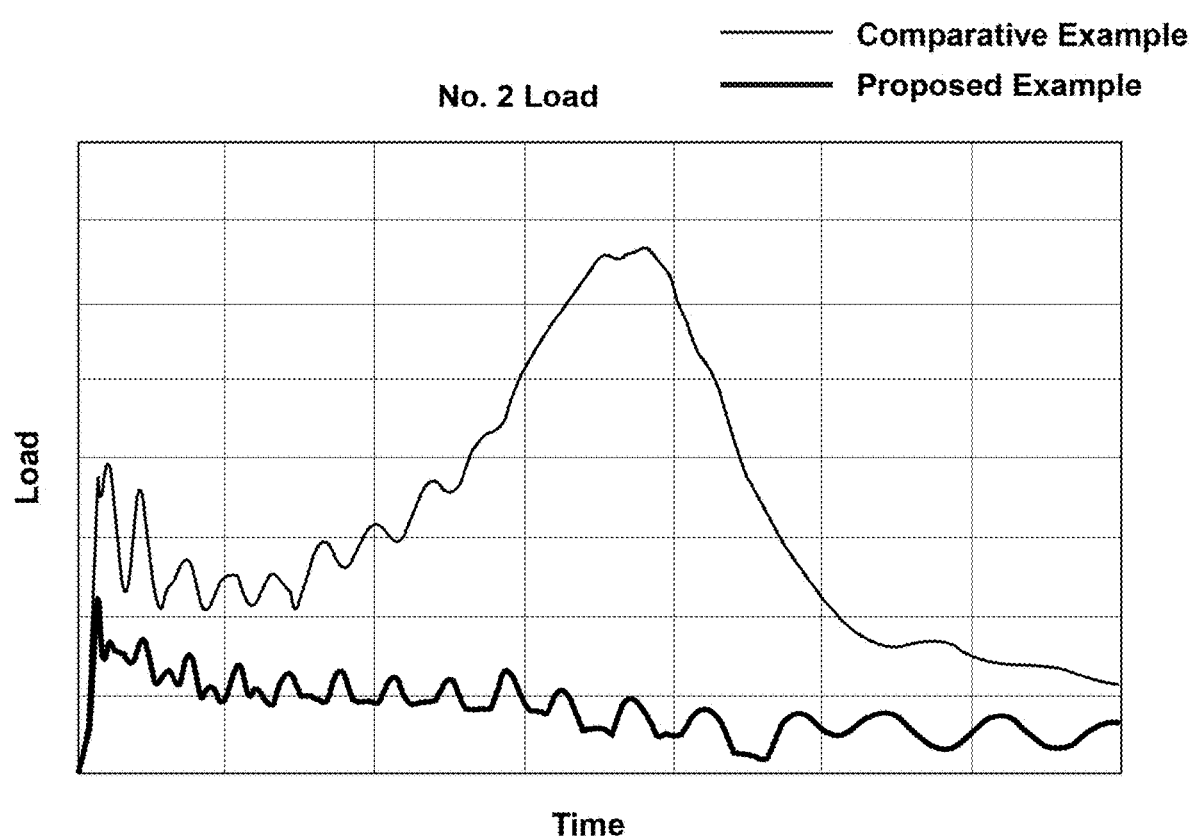
FIG. 10 compares two curves of loads (on the number two bearing) for the comparative example and the proposed example.

FIG. 10 compares two curves of loads (on the number two bearing) for the comparative example and the proposed example, respectively. As shown in FIG. 10, the loads on the number two bearings of the proposed example is much lower and more balanced compared to the comparative example.

Figure 11:
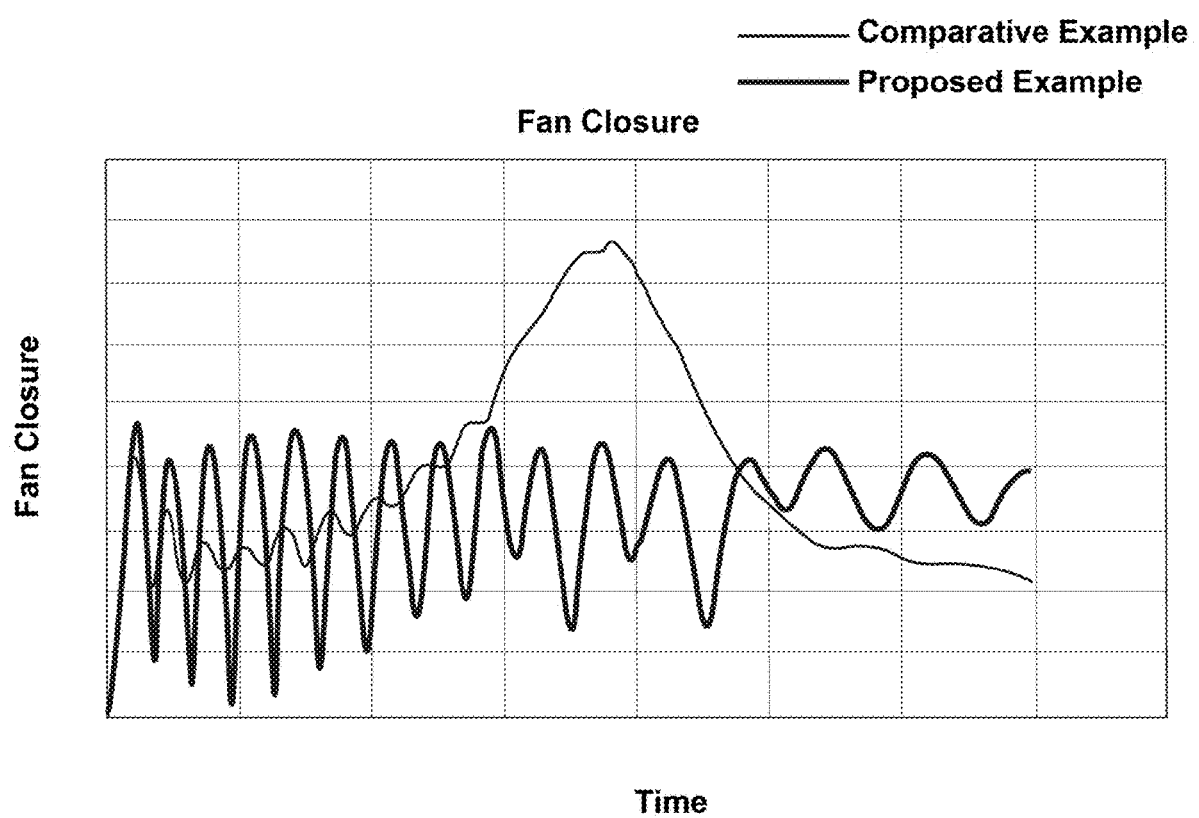
FIG. 11 compares two curves of fan closure for the comparative example and the proposed example.

FIG. 11 compares two curves of fan closure for the comparative example and the proposed example, respectively. As shown in FIG. 11, the fan closure in the proposed example is much more balanced compared to the comparative example.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A rotor assembly comprising:
   a fan rotor shaft coupled to a fan rotor;
   a low pressure turbine rotor shaft coupled to a low pressure turbine rotor; and
   a joint device configured to connect the fan rotor shaft to the low pressure turbine rotor shaft, to transfer torsion, shear and bending between the fan rotor shaft and the low pressure turbine rotor shaft under normal operation, and maintain transfer of torsion and shear and disconnect transfer of bending between the fan rotor shaft and the low pressure turbine rotor shaft under a fan blade-out event,
   wherein the joint device comprises a plurality of circumferentially-spaced curved splines in a spline joint and the circumferentially-spaced curved splines are accommodated in and engaging with corresponding plurality of grooves defined in the fan rotor shaft.

2. The rotor assembly according to claim 1, wherein the joint device is configured to allow angular misalignment between the fan rotor shaft and the low pressure turbine rotor shaft under the fan blade-out event.

3. The rotor assembly according to claim 1, wherein the joint device comprises a load reduction joint selected from the group consisting of a spherical spline joint, a constant velocity universal joint, an axial coupling, or a combination thereof.

4. The rotor assembly according to claim 3, wherein the joint device further comprises a cylindrical spline joint coupled to the load reduction joint.

5. The rotor assembly according to claim 1, wherein the joint device comprises a spherical spline joint coupled to the fan rotor shaft, and a cylindrical spline joint coupled between the spherical spline joint and the low pressure turbine rotor shaft.

6. The rotor assembly according to claim 5, wherein the spherical spline joint comprises spherical splines and spherical spline grooves defined in the fan rotor shaft for accommodating the spherical splines.

7. The rotor assembly according to claim 5, wherein the cylindrical spline joint comprises cylindrical splines formed on the outer face of the low pressure turbine shaft and cylindrical spline grooves defined on an inner face of the spherical spline joint.

8. The rotor assembly according to claim 5, wherein the joint device further comprises circumferentially-spaced mechanical fuses extending into both the fan rotor shaft and the spherical spline joint.

9. The rotor assembly according to claim 1, wherein the joint device comprises a cylindrical spline joint coupled to the fan rotor shaft and a load reduction joint coupled between the cylindrical spline joint and the low pressure turbine rotor shaft, wherein the cylindrical spline joint comprises cylindrical splines and cylindrical spline grooves, wherein the cylindrical spline grooves are defined in the fan rotor shaft, and the load reduction joint is selected from the group consisting of a constant velocity universal joint and an axial coupling.

10. The rotor assembly according to claim 1, further comprising:
a support frame;
a bearing assembly supporting the fan rotor shaft to the support frame; and
a cone shaft, comprising a conical cross-section and extending between the bearing assembly and the fan rotor shaft.

11. The rotor assembly according to claim 10, wherein at least a part of the fan rotor shaft is sandwiched between the cone shaft and the joint device.

12. A method for fabricating a rotor assembly for a gas turbine engine, the method comprising:
coupling a fan rotor shaft to a fan rotor;
coupling a low pressure turbine rotor shaft to a low pressure turbine rotor; and
connecting the fan rotor shaft to the low pressure turbine rotor shaft through a joint device, which is configured to transfer torsion, shear and bending between the fan rotor shaft and the low pressure turbine rotor shaft under normal operation, and maintain transfer of torsion and shear and disconnect transfer of bending between the fan rotor shaft and the low pressure turbine rotor shaft under a fan blade-out event, wherein the joint device comprises a plurality of circumferentially-spaced curved splines in a spline joint and the circumferentially-spaced curved splines are accommodated in and engaging with corresponding plurality of grooves defined in the fan rotor shaft.

13. The method according to claim 12, wherein the joint device is configured to allow angular misalignment between the fan rotor shaft and the low pressure turbine rotor shaft under the fan blade-out event.

14. The method according to claim 12, wherein the joint device comprises a load reduction joint selected from the group consisting of a spherical spline joint, a constant velocity universal joint, an axial coupling, or a combination thereof.

15. The method according to claim 14, wherein the joint device further comprises a cylindrical spline joint coupled to the load reduction joint.

16. The method according to claim 12, wherein the joint device comprises a spherical spline joint coupled to the fan rotor shaft, and a cylindrical spline joint coupled between the spherical spline joint and the low pressure turbine rotor shaft.

17. The method according to claim 16, wherein the joint device further comprises circumferentially-spaced mechanical fuses extending into both the fan rotor shaft and the spherical spline joint.

18. The method according to claim 12, wherein the joint device comprises a cylindrical spline joint coupled to the fan rotor shaft and a load reduction joint coupled between the cylindrical spline joint and the low pressure turbine rotor shaft, wherein the cylindrical spline joint comprises cylindrical splines and cylindrical spline grooves, wherein the cylindrical spline grooves are defined in the fan rotor shaft, and the load reduction joint is selected from the group consisting of a constant velocity universal joint and an axial coupling.

19. The method according to claim 12, further comprising supporting the fan rotor shaft on a support frame with a bearing assembly, with a cone shaft extending between the bearing assembly and the fan rotor shaft, the cone shaft comprising a conical cross-section.

* * * * *